US012266189B2

(12) United States Patent
Shao et al.

(10) Patent No.: US 12,266,189 B2
(45) Date of Patent: Apr. 1, 2025

(54) METHODS AND SYSTEMS FOR POST-DISASTER CONTACT IN SMART CITY BASED ON THE INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

(*) Notice: Subject to any disclaimer, the term of this patent is extended or adjusted under 35 U.S.C. 154(b) by 379 days.

(21) Appl. No.: 17/809,276

(22) Filed: Jun. 28, 2022

(65) Prior Publication Data
US 2023/0377349 A1 Nov. 23, 2023

(30) Foreign Application Priority Data
May 18, 2022 (CN) .......................... 202210539066.2

(51) Int. Cl.
*G06V 20/58* (2022.01)
*B60W 40/08* (2012.01)
(Continued)

(52) U.S. Cl.
CPC .............. *G06V 20/58* (2022.01); *B60W 40/08* (2013.01); *G06V 20/625* (2022.01); *B60W 2420/403* (2013.01); *B60W 2554/4049* (2020.02)

(58) Field of Classification Search
CPC ...... G06V 20/58; G06V 20/625; G06V 20/40; G06V 20/52; B60W 40/08;
(Continued)

(56) References Cited

U.S. PATENT DOCUMENTS 7,512,612 B1 * 3/2009 Akella .................... H04L 51/52
2014/0282934 A1 9/2014 Miasnik et al.
(Continued)

FOREIGN PATENT DOCUMENTS

AU 2020103199 A4 * 1/2021
CN 106778473 A * 5/2017
(Continued)

OTHER PUBLICATIONS

Shao, Zehua, Exploration and Research on the Structure of Internet of Things, Internet of Things Technologies Reliable Transmission, 2015, 10 pages.
(Continued)

*Primary Examiner* — Bobbak Safaipour
*Assistant Examiner* — Joshua Chen
(74) *Attorney, Agent, or Firm* — METIS IP LLC

(57) ABSTRACT

The embodiments of the present disclosure provide a method for post-disaster contact in a smart city based on Internet of Things, which is applied to a management platform. The method comprises: in response to the occurrence of a disaster event, obtaining event-related information from an object platform through a sensor network platform; determining information and status of one or more related objects based on the event-related information; determining one or more contact persons who need to be notified based on the information of the one or more related objects; and sending notification information to the one or more contact persons by sending the notification information to a user platform through a service platform.

13 Claims, 7 Drawing Sheets

(51) Int. Cl.
  *G06V 20/40* (2022.01)
  *G06V 20/52* (2022.01)
  *G06V 20/62* (2022.01)
  *H04W 4/38* (2018.01)
  *H04W 4/70* (2018.01)
(58) Field of Classification Search
  CPC ... B60W 2420/403; B60W 2554/4049; H04W 4/38; H04W 4/70; H04W 4/90; H04L 67/12; G06Q 50/265; G06Q 50/01; G16Y 10/75; G16Y 20/10; G16Y 40/10; G16Y 40/60
  See application file for complete search history.

(56) References Cited

U.S. PATENT DOCUMENTS

| | | | |
|---|---|---|---|
| 2018/0035284 A1* | 2/2018 | Fujinami | H04W 8/245 |
| 2021/0319329 A1* | 10/2021 | Yang | G06F 16/9024 |
| 2022/0163365 A1* | 5/2022 | Shao | H04L 67/12 |

FOREIGN PATENT DOCUMENTS

| | | | |
|---|---|---|---|
| CN | 112102582 A | | 12/2020 |
| CN | 112541912 A | | 3/2021 |
| KR | 101427413 B1 | * | 8/2014 |
| KR | 20190063729 A | * | 6/2019 |
| KR | 102323100 B1 | * | 11/2021 |

OTHER PUBLICATIONS

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

Shen, Hong et al., Intelligent management of data source in disaster medical emergency rescue, Journal of Tongji University Medical Science, 39(5): 1-4, 2018.

* cited by examiner

300

310 In response to the occurrence of a disaster event, obtaining event-related information from an object platform through a sensor network platform

320 Determine information and status of one or more related objects based on the event-related information

330 Determine one or more contact persons who need to be notified based on the information of the one or more related objects

340 Send notification information to the one or more contact persons by sending the notification information to the user platform through the service platform.

410 — Extract image frames based on the monitoring information, and determine a type of a vehicle in a target area by performing object recognition on the image frames 420 — In response to the type of the vehicle being the public vehicle, obtain ticket checking information of passengers of the public vehicle, and determine identities of the passengers in the public vehicle based on the ticket checking information of the passengers 430 — In response to the type of the vehicle being the private vehicle, determine a license plate number of the private vehicle by performing image recognition on the image frames, and determine an identity of an owner of the private vehicle based on the license plate number

510 Obtain a type of a target building

520 In response to the type of the target building being the residential building, obtain family information of the residential building, and determine the information of the one or more related objects based on the family information

530 In response to the type of the target building being the commercial building, obtain corporate information of the commercial building, and determine the information of the one or more related objects based on a social security relationship corresponding to the corporate information

FIG. 5

METHODS AND SYSTEMS FOR POST-DISASTER CONTACT IN SMART CITY BASED ON THE INTERNET OF THINGS

CROSS-REFERENCE TO RELATED APPLICATION

This application claims priority of Chinese Patent Application No. 202210539066.2, filed on May 18, 2022, the contents of which are entirely incorporated herein by reference.

TECHNICAL FIELD

This present disclosure relates to the field of post-disaster contact, and especially relates to a method and a system for post-disaster contact in a smart city based on Internet of Things.

BACKGROUND

After a disaster (such as earthquakes, traffic accidents, etc.), a disaster handling personnel needs to confirm the identity and a contact person of a disaster-stricken person, and to send a notification message to the contact person of the disaster-stricken person to allow the contact person to learn about the status of the disaster-stricken person in time. Usually, the contact person of the disaster-stricken person may be determined as the relatives of the disaster-stricken person, such as parents and children. When the disaster range is wide and the count of disaster-stricken persons is large, other contact persons of the disaster-stricken person (for example, friends) may also contact the disaster-stricken person, which may cause communication occupation due to inadequate contact notifications.

Therefore, it is necessary to provide a method for post-disaster contact in a smart city based on Internet of Things. By using the Internet of Things and cloud platforms, the efficiency of post-disaster contact work can be improved. At the same time, an appropriate range or number of contact persons can be determined according to the status of the disaster and the disaster-stricken person, thereby reducing communication occupation.

SUMMARY

One of the embodiments of the present disclosure provides a method for post-disaster contact in a smart city based on Internet of Things, which is applied to a management platform, comprising: in response to the occurrence of a disaster event, obtaining event-related information from an object platform through a sensor network platform; determining information and status of one or more related objects based on the event-related information; determining one or more contact persons who need to be notified based on the information of the one or more related objects; and sending notification messages to the one or more contact persons by sending the notification messages to a user platform through a service platform.

One of the embodiments of the present disclosure provides a system for post-disaster contact in a smart city based on Internet of Things, comprising: a user platform, a service platform, a management platform, a sensor network platform, and an object platform; the management platform is configured to perform the following operations: in response to the occurrence of a disaster event, obtaining event-related information from the object platform through the sensor network platform; determining information and status of one or more related objects based on the event-related information; determining one or more contact persons who need to be notified based on the information of the one or more related objects; and sending notification messages to the one or more contact persons by sending the notification messages to a user platform through a service platform.

One of the embodiments of the present disclosure provides a computer-readable storage medium, which stores computer instructions. When the computer reads the computer instruction in the storage medium, the computer executes the method for post-disaster contact.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which the same reference numerals represent the same structures, and wherein:

FIG. 3 is a flowchart illustrating an exemplary process for post-disaster contact in a smart city based on Internet of Things according to some embodiments of the present disclosure;

FIG. 4 is a flowchart illustrating an exemplary process for obtaining information and status of one or more related objects according to some embodiments of the present disclosure;

FIG. 5 is a flowchart illustrating an exemplary process for obtaining information and status of one or more related objects according to some other embodiments of the present disclosure;

DETAILED DESCRIPTION

Figure 1:
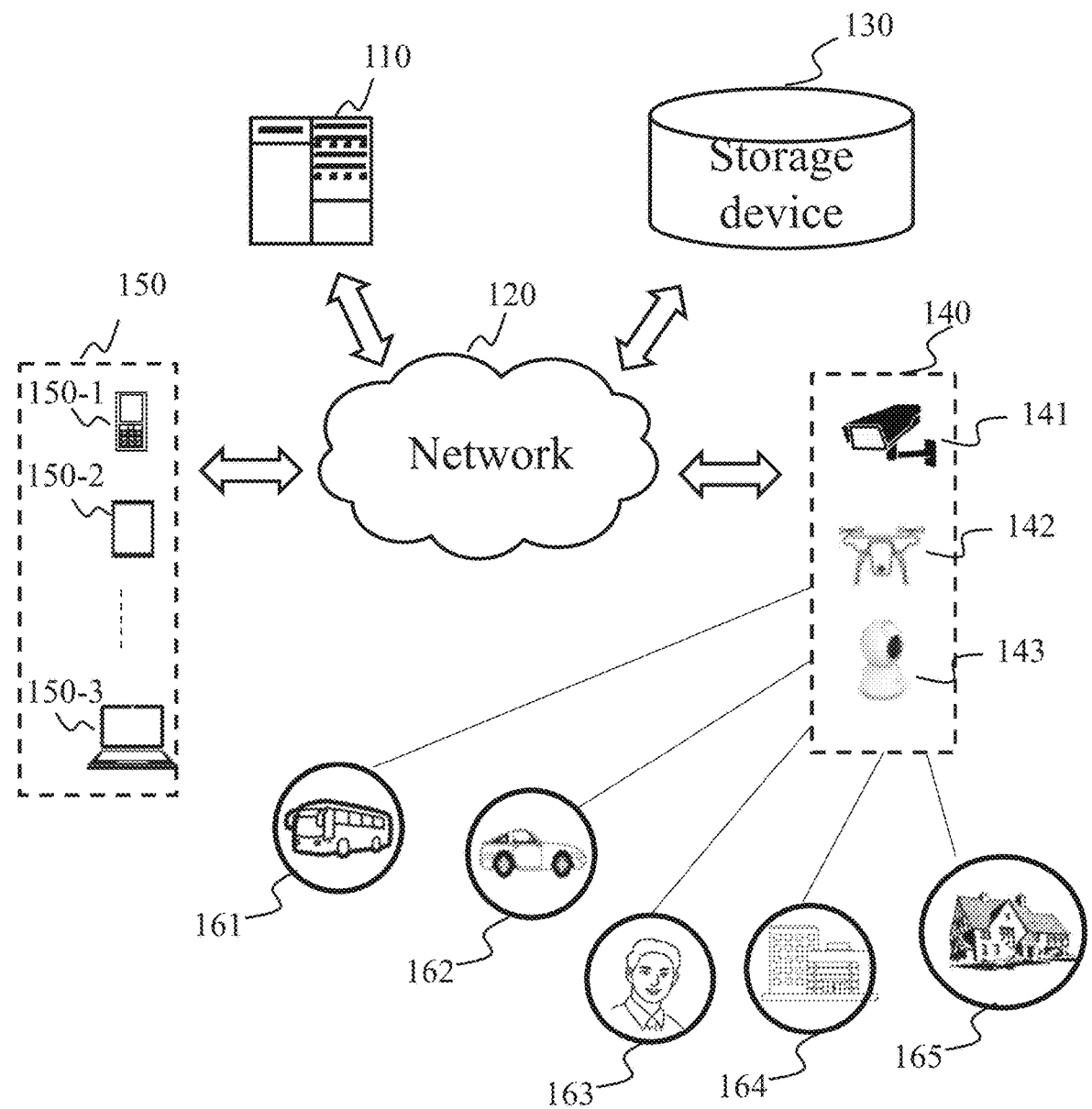
FIG. 1 is a schematic diagram of the application scenario of the system for post-disaster contact in a smart city based on Internet of Things according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the present disclosure, and those skilled in the art may apply this present disclosure to other similar situations based on these drawings and on the premise of not paying creative labor. Unless obviously obtained from the context or the context illustrates otherwise, the same numeral in the drawings refers to the same structure or operation.

It should be understood that "systems", "devices", "units", and/or "modules" used herein are one method for distinguishing different components, elements, components, parts, or assemblies of different levels. However, if other words may achieve the same purpose, the words may be replaced by other expressions.

As shown in the present disclosure and the claims, unless the context clearly describes exceptional circumstances, the words "a", "an" and/or "the" do not limit to the singular form, but may also include the plural form; the plural form may be intended to include singular form as well, unless the context clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to some embodiments of the present disclosure. It should be understood that the previous or back operations may not be accurately implemented in order. Conversely, the operations may be implemented in an inverted order, or simultaneously. At the same time, other operations may also be added to these processes, or a certain step or several steps may be removed from these processes.

FIG. 1 is a schematic diagram of the application scenario of the system for post-disaster contact in a smart city based on Internet of Things according to some embodiments of the present disclosure. As shown in FIG. 1, the application scenario 100 of the system for post-disaster contact in a smart city (or referred to as the system in short) based on Internet of Things may include a processing device 110, a network 120, a storage device 130, a data acquisition device 140, and a user terminal 150.

In some embodiments, one or more components of the application scenario 100 may be connected and/or communicate through the network 120 (such as wireless connection, wired connection, or its combination). As shown in FIG. 1, the processing device 110 may be connected to the storage device 130 through the network 120. As another example, the processing device 110 may be connected to the data acquisition device 140 through the network 120, so that the processing device 110 may analyze and process the information obtained by the data acquisition device 140. As another example, the processing device 110 may be connected to the user terminal 150 through the network 120, so that the processing device 110 may receive and process the information entered by the user through the user terminal 150.

The processing device 110 may be used to process information and/or data related to the application scenario 100, for example, disaster event-related information (or event-related information), information of one or more related objects, energy consumption information, etc. The processing device 110 may process the data, information, and/or processing results obtained from other devices or components of the system, and perform program instructions based on these data, information, and/or processing results to perform one or more functions described in the present disclosure. In some embodiments, the processing device 110 may be configured to maintain and manage the management platform.

The network 120 may connect various components of the application scenario 100 and/or connect the application scenario 100 with external resources. The network 120 may allow communication between the various components and other parts outside the application scenario 100 to promote the exchange of data and/or information. The network may include a local area network (LAN), a wide area network (WAN), the Internet, or the like, or any combination thereof.

The storage device 130 may be used to store data and/or instructions. In some embodiments, the storage device 130 may store data and/or instructions executed by the processing device 110 to implement an exemplary method described in the present disclosure. In some embodiments, the storage device 130 may be connected to the network 120 to communicate with one or more components of the application scenario 100 (for example, the processing device 110, and the data acquisition device 140).

The data acquisition device 140 refers to a device with the function of obtaining information/data. In some embodiments, the data acquisition device 140 may include but is not limited to a monitoring device 141, a drone 142, a camera 143, etc. In some embodiments, the data acquisition device 140 may be an independent device, such as the drone 142. In some embodiments, the data acquisition device 140 may also be a component set in the user terminal 150, such as the camera 143 in the mobile phone.

In some embodiments, the data acquisition device 140 may use an acquisition device to obtain the disaster information in the place where the disaster occurred from the outside world. For example, during a traffic accident, the data acquisition device 140 may use the monitoring device 141 on the highway to obtain the monitoring video of the accident vehicle. The type of the accident vehicle may be a public vehicle 161, a private vehicle 162, etc. As another example, when an earthquake occurs, the data acquisition device 140 may use drone 142 to enter the disaster-stricken building and shoot videos to obtain the disaster-stricken situation and information in the disaster-stricken building. The type of disaster-stricken building may be a commercial building 164, a residential building 165, etc. As another example, the data acquisition device 140 may also obtain the disaster-stricken information and status from personnel 163. For example, the data acquisition device 140 uses the camera to take pictures/videos of the disaster-stricken personnel.

The data acquisition device 140 may be connected with the processing device 110 through the network 120 to enable the information obtained by the data acquisition device 140 (for example, monitoring information, video information, image information) to be passed to the processing device 110 for data processing.

The user terminal 150 may be used to input information and/or data about the application scenario 100 by the user, for example, the type of the disaster event, the type of the building, the type of the vehicle, the disaster time, etc. The user terminal 150 may also be used to receive information and/or data related to the application scenarios 100 by the user, for example, notification information related to the disaster-stricken person, output information of the model, output information of image recognition, etc. In some embodiments, the user terminal 150 may include a mobile device 150-1 (e.g., mobile phone, etc.), a tablet computer 150-2, a laptop computer 150-3, or the like, or any combination thereof.

In some embodiments, the user may be a disaster-stricken (or disaster-affected) person in the disaster event, a related person related to the disaster-stricken personnel (such as relatives, friends), a disaster rescue personnel, or a disaster handling personnel (such as police and other government staff). For example, the disaster-stricken personnel in the disaster event may upload disaster information and send information for rescue through the user terminal 150. As another example, the related person of the disaster-stricken personnel may receive notification information through the user terminal 150 to know about the disaster-stricken situation of the disaster-stricken personnel. For another example, the disaster rescue personnel may upload/receive the disaster information through the user terminal 150.

It should be noted that the application scenario is only provided for illustrative purposes and is not intended to limit the scope of the present disclosure. For those skilled in the art, various modifications or changes may be made based on the description of the present disclosure. For example, the application scenario may also include a database. As another example, the application scenario may be implemented on other devices to achieve similar or different functions. However, changes and modifications do not deviate from the scope of the present disclosure.

The system for the Internet of Things is an information processing system that includes part or all of a user platform, a service platform, a management platform, a sensor network platform, and an object platform. The user platform is the leader of the entire Internet of Things operation system. User demand is the foundation and premise of the formation of the Internet of Things operation system. The connection between other platforms of the Internet of Things is to meet the user demand. The service platform may provide the user with input and output service, which is a bridge of connection between the user and the management platform. The management platform may realize the connection and collaboration between various functional platforms (such as the sensor network platform and the object platform). The management platform brings together information about the Internet of Things operation system, which may provide the functions of perception management and control management for the Internet of Things operation system. The sensor network platform may realize the connection between the management platform and the object platform, and play the functions of perceptual information sensor communication and controlling information sensor communication. The object platform may be a functional platform for generating perceptual information and executing controlling information.

The processing of information in the Internet of Things system may be divided into the processing flow of perceptual information and the processing flow of controlling information. Controlling information may be information generated based on perceptual information. The processing of the perceptual information means that the perceptual information is obtained by the object platform and transmitted to the management platform through the sensor network platform. The management platform transmits the calculated perceptual information to the service platform and finally passes it to the user platform. The controlling information is generated after judging and analyzing the perceptual information by the user. The controlling information is generated by the user platform and sent to the service platform, and the service platform passes the controlling information to the management platform. The management platform calculates the controlling information and sends it to the object platform through the sensor network platform to achieve the control of the corresponding object.

In some embodiments, when the Internet of Things system is applied to city management, it may be called the Internet of Things system of a smart city.

Figure 2:
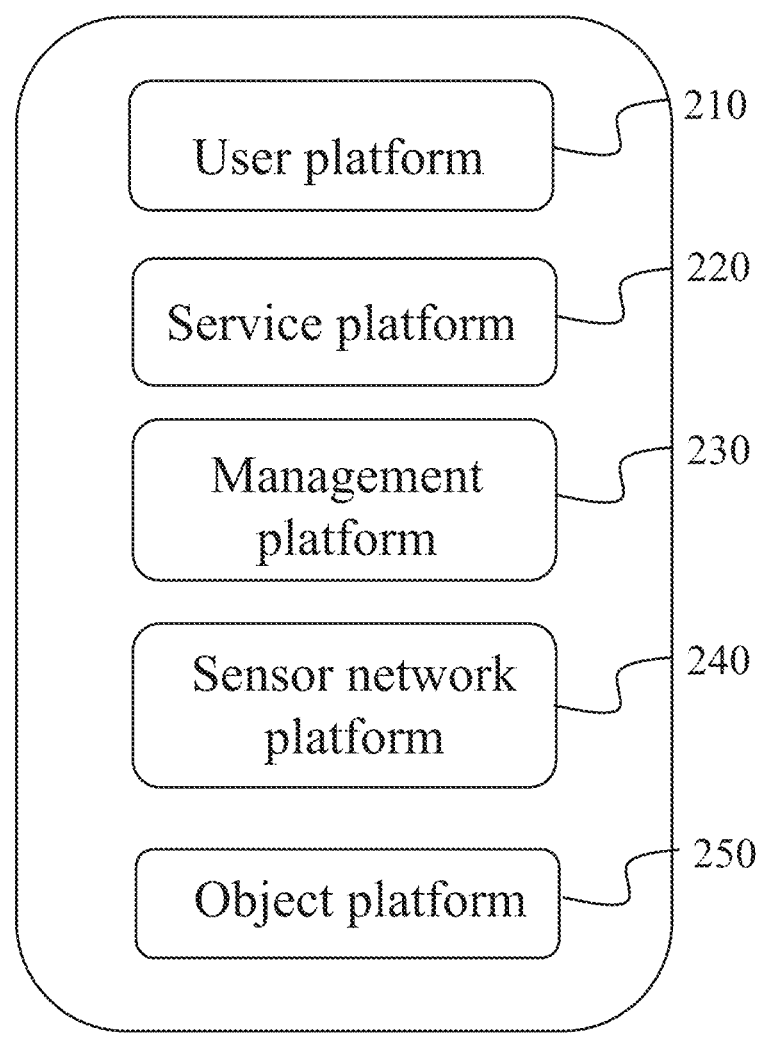
FIG. 2 is an exemplary module diagram of the system for post-disaster contact in a smart city based on Internet of Things according to some embodiments of the present disclosure.

FIG. 2 is an exemplary module diagram of the system for post-disaster contact in a smart city based on Internet of Things according to some embodiments of the present disclosure. As shown in FIG. 2, the system 200 for post-disaster contact in a smart city based on Internet of Things comprises a user platform 210, a service platform 220, a management platform 230, a sensor network platform 240, and an object platform 250. In some embodiments, the system 200 for post-disaster contact in a smart city based on Internet of Things may be part of the processing device 110 or implemented by the processing device 110.

In some embodiments, the system 200 for post-disaster contact in a smart city (or referred to the system 200 in brief) based on the Internet of Things may be applied to a variety of scenarios related to post-disaster contact. In some embodiments, the system 200 for post-disaster contact in a smart city based on Internet of Things may obtain a variety of data related to the disaster, such as disaster occurrence data, disaster situation data, rescue data, data of shortage material, material donation data, etc. In some embodiments, the Internet of Things system used to achieve post-disaster contact may achieve disaster management and specify rescue strategies based on a variety of data obtained.

A variety of scenarios of disaster management may include the evaluation of the disaster-stricken personnel, the planning of rescue routes, the prediction of rescue materials, and the resettlement of the disaster-stricken personnel. It should be noted that the above scenario is only an example, and it does not restrict the specific application scenarios of the system 200. Based on the disclosure of the embodiments, those skilled in the art may apply the system 200 to any other appropriate scenarios.

In some embodiments, the system 200 for post-disaster contact in a smart city based on Internet of Things may be applied to the evaluation of the disaster-stricken personnel. When the system 200 is applied to the evaluation of the disaster-stricken personnel, the user platform may collect the disaster information (such as the type of disaster, severity, disaster-stricken location, and rescue required) entered by the disaster-stricken user or other users who knows the disaster situation and corresponding user information (such as identity information, family information, work information, etc.) of users who uploads the information, e.g., the disaster information. The user platform may upload the collected data to the management platform through the service platform. At the same time, the object platform may collect images of the actual disaster scene and collect other relevant data in the disaster-stricken area (such as network status data, power-on conditions, water supply data, gas supply data, etc.). The object platform may upload the collected data to the management platform through the sensor network platform. The management platform may summarize and analyze the collected data, obtain the analysis data (such as analyzing the count of families, the count of enterprises, the count of merchants which are affected in the disaster) of the corresponding disaster-stricken situation, and then obtain the count of the corresponding disaster-stricken persons to formulate a disaster relief plan that is more in line with actual needs.

In some embodiments, the system 200 for post-disaster contact in a smart city based on Internet of Things may be applied to plan rescue routes. When the system 200 is applied to plan rescue routes, the user platform may collect relevant information (such as the type of disaster, severity, disaster-stricken location, rescue required, and the surrounding traffic conditions of the location to be rescued) of the disaster-stricken personnel, and corresponding user information (such as identity information, family information, work information, etc.) of users who uploads the information, e.g., relevant information. The user platform may upload the collected data to the management platform through the service platform. At the same time, the object platform may collect the images of the actual disaster site (or scene) and collect other relevant data in the disaster-stricken area (such as traffic conditions, weather data, people flow data, traffic flow data, etc.). The object platform may upload the collected data to the management platform through the sensor network platform. The management platform may summarize and analyze the collected data, and obtain the analysis data of traffic conditions in the corresponding disaster-stricken area so that the rescue route may be planned and the disaster-stricken personnels may be rescued as soon as possible.

In some embodiments, the system 200 for post-disaster contact in a smart city based on Internet of Things may be applied to the prediction of rescue materials. When the system 200 is applied to the prediction of rescue materials, the user platform may collect relevant information of the disaster-stricken personnel, such as the type of disaster, severity, disaster-stricken location, the type of rescue required, the type and amount of the required rescue materials, and corresponding user information (such as identity information, family information, work information, etc.) of users who uploads the information, e.g., the disaster information. The user platform may also collect information such as recent situation information of historical donors and user information of candidate donors, such as identity information, family information, work information, donation intentions, etc. The user platform may upload the collected data to the management platform through the service platform. At the same time, the object platform may collect the images of the actual disaster site and collect other relevant data in the disaster-stricken area (such as weather data, traffic data, etc.). The object platform may upload the collected data to the management platform through the sensor network platform. The management platform may summarize and analyze the collected data. For example, the management platform may firstly determine quasi-donation users with capability and strong donation intentions according to identity information, family information, work information, donation intentions, etc., and then predict the possible donations of the quasi-donation users and the corresponding prices based on historical information. At the same time, the management platform may also analyze the above data to determine disaster-stricken areas where various donations are in short supply, sort the urgency degree of each area based on the evaluation of the disaster-stricken personnels, and send various types of disaster relief items to the disaster-stricken areas that are really needed.

In some embodiments, the system 200 for post-disaster contact in a smart city based on Internet of Things may be applied to the resettlement of the disaster-stricken personnel. When the system 200 is applied to the resettlement of the disaster-stricken personnel, the user platform may collect relevant information of the disaster-stricken personnel, such as the type of disaster, severity, disaster-stricken location, the type of rescue required, the type and amount of the required rescue materials, and corresponding user information (such as identity information, family information, work information, etc.) of users who uploads the information, e.g., the disaster information. The user platform may also collect the corresponding information about the resettlement area, such as the location of the resettlement site, the number of persons that may be accommodated, the existing materials, etc. The user platform may upload the collected data to the management platform through the service platform. At the same time, the object platform may collect images of the actual disaster-stricken area and the resettlement area, and collect other related data of the disaster-stricken area and the resettlement area, such as the weather data and traffic data of the disaster-stricken area and the resettlement area. The platform may upload the collected data to the management platform through the sensor network platform. The management platform may summarize and analyze the collected data. For example, the management platform may predict the type and number of people that may be accepted in the future based on the existing situation of each resettlement area. The management platform may determine the farthest resettlement distance that the material or disaster-stricken persons may be transported according to the persons in the disaster-stricken areas and the severity of the disaster-stricken area. The management platform may predict the manpower and material resources that are short in the future based on the disaster-stricken situation, and determine the resettlement plan for each disaster-stricken personnel based on the actual situation in each resettlement area.

The user platform 210 may refer to a platform led by a user, including a platform for obtaining the input of the user and giving feedback information to the user. In some embodiments, the user platform 210 may be configured to receive user needs, such as information for rescue from the disaster-stricken personnel (or disaster-stricken person, disaster-stricken people).

The service platform 220 may refer to a platform that conveys the input of the user and control information (or controlling information). It connects the user platform 210 and the management platform 230.

In some embodiments, the service platform 220 may obtain the user's needs based on the user platform 210 (for example, information for rescue from the disaster-stricken personnel), and give feedback on the result of the information for rescue to the user.

The management platform 230 may refer to a platform for managing post-disaster contact. In some embodiments, the management platform 230 may be configured to, in response to the occurrence of a disaster event, obtain event-related information from the object platform 250 through the sensor network platform 240; determine information and status of one or more related objects based on the event-related information; determine one or more contact persons who need to be notified based on the information of the one or more related objects; and send notification information to the one or more contact persons by sending the notification information to the user platform 210 through the service platform 220.

In some embodiments, the management platform 230 may be configured to extract image frames based on monitoring information; and determine the information and status of the one or more related objects by performing image recognition on the image frames.

In some embodiments, the management platform 230 may be configured to extract image frames based on the monitoring information, and determine a type of a vehicle in a target area by performing target recognition on the image frames; wherein the type of the vehicle comprises a public vehicle and a private vehicle; in response to the type of the vehicle being the public vehicle, obtaining ticket checking information of passengers of the public vehicle, and determining identities of the passengers in the public vehicle based on the ticket checking information of the passengers; and in response to the type of the vehicle being the private vehicle, determining a license plate number of the private vehicle by performing image recognition on the image frames, and determining an identity of an owner of the private vehicle based on the license plate number.

In some embodiments, the management platform 230 may be configured to obtain a type of a target building; wherein the type of the target building comprises a residential building and a commercial building; in response to the type of the target building being the residential building, obtaining family information of the residential building, and determining the information of the one or more related objects based on the family information; in response to the type of the target building being the commercial building, obtaining corporate information of the commercial building, and determining the information of the one or more related objects based on a social security relationship corresponding to the corporate information.

In some embodiments, the management platform 230 may be configured to determine the one or more contact persons who need to be notified based on the information of the one or more related objects and a relationship map.

In some embodiments, the management platform 230 may be configured to obtain social subgraphs that respectively meet a preset requirement of related objects of the one or more related objects based on the relationship map; determine one or more common nodes based on the social subgraphs corresponding to the one or more related objects; and in response to the common nodes that meet a preset condition, determining one or more persons corresponding to the one or more common nodes as the one or more contact persons who need to be notified.

The sensor network platform 240 may refer to a platform that receives and transmits information and/or data. The sensor network platform 240 connects the management platform 230 and the object platform 250. In some embodiments, the sensor network platform 240 may send the information obtained by the object platform 250 (for example, disaster information) to the management platform 230, or transmit the instruction based on the instruction information of the management platform 230 to the object platform 250.

The object platform 250 may refer to a functional platform for executing the operation. For example, the object platform 250 may obtain disaster information at the place where the disaster occurred (for example, monitoring information, video information, image information).

It should be noted that the above descriptions of the system and its components are intended to be convenient, and the present disclosure cannot be limited to the scope of the embodiments. It may be understood that for those skilled in the art, after understanding the principle of the system, it is possible to arbitrarily combine the various parts, or form a subsystem to connect with other parts without departing from the principle. For example, each component may share a storage device, and each component may also have its own storage device. Such deformations may be all within the scope of the protection of the present disclosure.

FIG. 3 is a flowchart illustrating an exemplary process for post-disaster contact in a smart city based on Internet of Things according to some embodiments of the present disclosure. As shown in FIG. 3, process 300 includes the following steps. In some embodiments, process 300 may be performed by the management platform 230.

Step 310, in response to the occurrence of a disaster event, obtaining event-related information from an object platform through a sensor network platform.

A disaster event may refer to an event that harms the human survival environment and/or personal safety. The disaster event may include a natural disaster, for example, an earthquake, a fire disaster, a flood disaster, etc. The disaster event may also include an accidental disaster, for example, a traffic accident, a building collapse, etc.

Event-related information may refer to information related to the disaster event. For example, the event-related information may include the type, severity, location information, and personnel information of the disaster event. In some embodiments, the event-related information may include but is not limited to one or more of monitoring information, vehicle information (for example, vehicle type information, location information, ticket checking information, vehicle owner information), building information (for example, address information, energy consumption information), etc.

In some embodiments, the management platform may communicate with the object platform by the sensor network platform. The management platform may obtain the event-related information based on the object platform through the sensor network platform. For example, when a disaster event occurs, the object platform may obtain the event-related information through the perception unit (such as a camera, and a drone), and transmit the event-related information to the sensor network platform. The management platform obtains event-related information from the sensor network platform.

Step 320, determine information and status of one or more related objects based on the event-related information.

The one or more related objects may be object(s) related to the disaster event, for example, the disaster-stricken people, and the disaster-stricken goods (such as construction, vehicles, device, facilities, etc.). The information and status of the one or more related objects may refer to relevant information and status associated with the related objects. For example, when a related object is a person, the relevant information of the related object may include the basic information of the related object, such as name, contact information, working address, family address, relatives, etc.; and the status of the related object may include the status information of the related object, such as mental state (such as coma/awake state), physical state (such as moving/non-movement state), etc. As another example, when a related object is goods, the relevant information of the related object may include the location information of the related object, the information of people the related object belongs to, etc.; and the status of the related object may include the damage situation to the related object.

In some embodiments, the management platform may determine the information and status of the one or more related objects based on the event-related information. For example, after a disaster event occurs, the management platform may obtain live pictures, video, audio, and other event-related information which are collected by the object platform and uploaded by the sensor network platform. The management platform determines the information and status of the related objects by identifying and analyzing the obtained information. Merely by way of example, the management platform may determine the types of the related objects based on the event-related information, such as person and/or goods. Then, the management platform may determine the information and status of the related objects according to the types of the related objects. For example, when the management platform determines a related object as a person, the management platform may further determine the basic information and status information of the related object based on the event-related information; when the management platform determines a related object as goods, the management platform may further determine the location information and damage situation of the related object based on the event-related information.

In some embodiments, the management platform may determine the information and status of the related objects through the following methods: extracting image frames based on monitoring information; and determining the information and status of the one or more related objects by performing image recognition on the image frames.

In some embodiments, the event-related information may include monitoring information. The monitoring information may be information obtained by using a monitoring device (such as a camera), for example, monitor image information, monitor video information, etc. The monitoring information may reflect the disaster-stricken situation of the related objects in the disaster. For example, when a related object is a person, the state of the person in the monitoring information may reflect the mental state and physical state of the related object in the disaster event. As another example, when a related object is goods (or thing), the monitoring information may reflect the location information and damage degree of the related object in the disaster event.

In some embodiments, the monitoring device may shoot the related objects in the disaster event to obtain the monitoring information. For example, when a traffic accident occurs, the camera in the road (for example, the crossroads and the entrance) may shoot an accident vehicle and an accident person to obtain monitoring information. As another example, when a fire occurs, the drone may be sent to the fire scene to shoot videos to obtain the monitoring information.

The image frames may refer to a unit image screen in the monitoring information. For example, an image frame may be a picture or an action. Different image frames may correspond to different time points in the monitoring information. In some embodiments, the monitoring information may include a plurality of continuous image frames, and a plurality of continuous image frames may form a set of monitoring videos.

In some embodiments, the management platform may extract image frames based on the monitoring information. For example, the management platform may extract a plurality of image frames from the monitoring video according to a specific time interval (for example, 5 seconds, 10 seconds, and 1 minute). As another example, the management platform may randomly extract a plurality of image frames corresponding to a plurality of time points from the monitoring video.

Image recognition may refer to the process of analyzing and processing an image to identify an image feature. The image feature may be a feature of a target in the image. For example, an image feature may include a target type (for example, people or goods), a target action, a target position, etc. In some embodiments, the management platform may recognize image frames to obtain image features in the monitoring video. For example, the management platform may directly perform face recognition on a person (that is, the disaster-stricken object) in an image frame to determine the identity information of the disaster-stricken object. As another example, the management platform may perform image recognition on an image frame to obtain a position of a target in the monitoring video. As another example, the management platform may perform image recognition on an image frame to obtain target movement (target action) or a movement trajectory in the monitoring video.

In some embodiments, the management platform may perform image recognition on an image frame to determine the information and status of the related objects. In some embodiments, the management platform may perform image recognition on one or more image frames to obtain the image features in the monitoring video, and then determine the information and status of the related objects based on the image features in the monitoring video. For example, the management platform may perform image recognition on a plurality of image frames to obtain a plurality of object actions in the monitoring video, and then determine the information and status of the related objects based on the relationship between a plurality of object actions. Merely by way of example, when analyzing the monitoring video in the disaster-stricken house after the earthquake, if a related object in an image frame is human, it may be considered that the condition of the related object is very likely to be injured and enter a coma by determining that the related object does not move or has no action for more than a preset time threshold based on image recognition on a plurality of image frames obtained. As another example, the management platform may perform image recognition on one or more image frames to obtain image features in the monitoring video and compare the image features with standard image features to determine the information and status of the related objects. Standard image features may refer to features of images that are not disaster-stricken by disaster events.

For more descriptions of determining the information and status of the related objects, see FIG. 4 and FIG. 5 and its description.

Step 330, determine one or more contact persons who need to be notified based on the information of the one or more related objects.

The one or more contact persons may be persons related to the one or more related objects. For example, when a related object is a person, the contact persons may include relatives, friends, colleagues, etc. of the related object. As another example, when a related object is goods, the contact persons may include a person to which the related object belongs, relatives, friends, colleagues of the person to which the related object belongs, etc. In some embodiments, the contact persons may also be disaster rescue personnel or handling personnel corresponding to the area of the disaster occured, such as 119, or government staff such as traffic police and public security police.

In some embodiments, information such as each related object and its corresponding contact persons and contact information may be stored in the storage device (such as storage device 130) in advance. After determining the information of the related object, the contact persons who need to be notified may be determined based on the pre-stored message.

In some embodiments, the management platform may determine one or more contact persons who need to be notified based on the information of the one or more related objects. In some embodiments, the management platform may judge the disaster-stricken degree of the related objects based on the information of the related objects, and then determine the contact persons who need to be notified according to the disaster-stricken degree. The more severe the disaster-stricken degree of the related objects, the larger the number or scope of the persons who need to be notified. For example, when the disaster-stricken degree of a related object is mild, the contact person who needs to be notified is a relative of the related object (such as a direct relative). As another example, when the disaster-stricken degree of the related object is severe, the contact persons who need to be notified are relatives and friends of the related object.

In some embodiments, the management platform may also determine the contact person who needs to be notified based on the information of the related object and relationship map. The relationship map may refer to a map related to the related objects. The relationship map may reflect the relationship between different related objects. For more descriptions of determining the contact person who needs to be notified based on the relationship map of the related object, see FIG. 6 and FIG. 7 and their instructions.

Step 340, send notification information to the one or more contact persons by sending the notification information to the user platform through the service platform.

The notification information may be information related to the related objects, for example, the position of a related object, whether the related object is safe, the disaster-stricken degree, the disaster-stricken time, etc. The contact persons may know the information related to the related objects from the notification information. In some embodiments, the method of notification information may include but is not limited to SMS notification, APP notification, telephone notification, broadcast notification, etc. In order to reduce communication occupation, the method of notification information may be SMS notification or APP notification.

In some embodiments, the management platform may send the notification information (e.g., notification messages) to the user platform through the service platform to send notification information to the contact persons. For example, the management platform may obtain the contact way of the contact persons based on the contact persons who need to be notified in step 330 and then send notification information to the contact persons according to the contact way through the service platform.

Some embodiments of the present disclosure may automatically determine the information and status of the related objects through the information related to the disaster-stricken event, and determine the contact persons who need to be notified and send the notification information (e.g., messages) to the contact person, thereby reducing communication occupation.

It should be noted that the description of the relevant process 300 is merely for example and description, without limiting the scope of the present disclosure. Process 300 may be made various modifications and changes by those skilled in the art under the guidance of the present disclosure. However, these modifications and changes are still within the scope of the present disclosure.

FIG. 4 is a flowchart illustrating an exemplary process for obtaining information and status of one or more related objects according to some embodiments of the present disclosure. As shown in FIG. 4, process 400 includes the following steps. In some embodiments, process 400 may be performed by the management platform 230.

Step 410, extract image frames based on the monitoring information, and determine a type of a vehicle in a target area by performing target recognition on the image frames.

The target area may be an area within a certain distance from the disaster-stricken area. In some embodiments, the target area may include the disaster-stricken center area, the disaster-stricken spread area, and the disaster-stricken buffer area. The disaster-stricken degrees of different positions in the target area may be different. For example, the disaster-stricken degree of the disaster-stricken center area is higher than that of the disaster-stricken spread area, and the disaster-stricken spread area is higher than that of the disaster-stricken buffer area.

Target recognition refers to the process of determining a target of information such as the image and other information, for example, determining that the image contains a target vehicle, a target device, etc. In some embodiments, target recognition may be implemented based on judging the type and features of the target. In some embodiments, target recognition may be implemented based on the analysis and processing by an artificial mode or machine learning models.

The type of the vehicle may refer to category information of the target vehicle. The type of the vehicle may be distinguished according to a feature of the vehicle, the purpose and function of use of the vehicle. In some embodiments, the type of the vehicle may include a public vehicle and a private vehicle.

The public vehicle may refer to a vehicle for social services. For example, public vehicles may include buses, subways, public passenger cars, taxis, etc.

The private vehicle may refer to a vehicle for individual/family services. For example, private vehicles may include private cars, private trucks, and private passenger cars.

In some embodiments, the management platform may extract image frames based on the monitoring information, and determine a type of a vehicle in the target area by performing target recognition on the image frames. For example, the management platform may extract image frames based on the monitoring information, obtain a target feature by performing target recognition on the image frames, and determine the type of the vehicle in the target area according to the target feature. In some embodiments, the management platform may perform target recognition on a plurality of target vehicles in the image frames to obtain features of the corresponding vehicles, and determine the type of the vehicle corresponding to each vehicle according to the feature of each vehicle.

Step 420, in response to the type of the vehicle being the public vehicle, obtain ticket checking information of passengers of the public vehicle, and determine identities of the passengers in the public vehicle based on the ticket checking information of the passengers.

Ticket checking information may be the corresponding voucher information when passengers get on a public vehicle. For example, the ticket checking information includes ticket information, identity information, account information, card swiping information, health code information, etc. Merely by way of example, passengers may get on the public vehicle through scanning documents (such as ID cards, student IDs, passports, etc.). At this time, the ticket checking information may include identity information of the passengers. As another example, passengers may get on the public vehicle by scanning a QR code in the car app. At this time, the ticket checking information may include account information of the passengers. As another example, passengers may get on the public vehicle by swiping cards. At this time, the ticket checking information may include card swiping information of the passengers. As another example, passengers need to scan their health codes when riding. At this time, the ticket checking information may include health code information of the passengers.

In some embodiments, when the type of vehicle is a public vehicle, the management platform may obtain the ticket checking information of passengers of the public vehicle, and determine the identities of the passengers in the vehicle based on the ticket checking information of the passengers. In some embodiments, the management platform may determine passenger information based on the ticket checking information of passengers of the public vehicle, thereby determining the identities of the persons (or passengers) in the vehicle. For example, the management platform may determine the identity and family address of a passenger according to the document (such as the ID card) scanned when passenger gets on the public vehicle. As another example, the management platform may determine the identity and contact information of a passenger based on the health code scanned when the passenger gets on the public vehicle.

Step 430, in response to the type of the vehicle being the private vehicle, determine a license plate number of the private vehicle by performing image recognition on the image frames, and determine an identity of an owner of the private vehicle based on the license plate number.

In some embodiments, when the management platform extracts image frames based on monitoring information, images of the image frames may include a license plate of the private vehicle. The license plate number of the private vehicle may be determined by performing image recognition on the license plate of the private vehicle.

In some embodiments, when the type of vehicle is a private vehicle, the management platform may perform image recognition on the license plate in the image frames to determine an image feature of the license plate, thereby determining the license plate number of the private vehicle. The license plate number of the private vehicle corresponds to the owner of the private vehicle. The management platform may determine the owner's identity according to the license plate number of the private vehicle.

The identities of persons (or a person) in the vehicle (e.g., passengers of the vehicle, or owner of the vehicle) may be determined in different ways through different types of vehicles, the identity of the person in the vehicle can be quickly and accurately determined according to information related to different vehicles (for example, ticket checking information of passengers, license plate number) to ensure that the persons in the vehicle in the target area may be not missed.

In some embodiments, determining the information and status of one or more related objects based on the event-related information also includes: identifying an appearance image of the vehicle through a model to determine the integrity of the appearance of the vehicle; and based on the integrity of the appearance of the vehicle, evaluating the status of persons in the vehicle.

The status of the persons in the vehicle may refer to the physical state and/or mental state of the persons in the vehicle. In some embodiments, the status of the persons in the vehicle may include physical state, for example, safety, slight injuries, minor injuries, serious injuries, etc. In some embodiments, the status of the persons in the vehicle may include the mental state, for example, coma state and awake state.

In some embodiments, the appearance image of the vehicle may be identified through the model to determine the integrity of the vehicle (or the integrity of the appearance of the vehicle); and then the model evaluates the status of the persons in the vehicle based on the integrity of the appearance of the vehicle.

The model may refer to a machine learning model, such as an evaluation model. The evaluation model may evaluate the integrity of the vehicle and the status of the persons in the vehicle. In some embodiments, the evaluation model may include an integrity judgment layer and a status assessment layer. The integrity judgment layer is used to assess the integrity of the vehicle (or vehicle integrity). The status assessment layer is used to assess the status of the persons in the vehicle.

The input of the integrity judgment layer may be appearance data of the vehicle. For example, the input of the integrity judgment layer may include one or more of the deformation degree of the vehicle body, the defect condition of a component of the vehicle body, and the change condition of the color of the vehicle body. The output of the integrity judgment layer may be the result of vehicle integrity judgment. In some embodiments, the result of vehicle integrity judgment may be output in the form of percentages. For example, the vehicle integrity is 60%, 80%, etc. In some embodiments, the result of the vehicle integrity judgment may be described by the level of damage, for example, the degree of minor damage, severe damage, etc.

The input of the status assessment layer may be the output of the integrity judgment layer. That is, the input of the status assessment layer may be the result of vehicle integrity judgment. The output of the status assessment layer may be the state of the persons in the vehicle. For example, the output of the status assessment layer may include the mental state of the persons in the vehicle, such as coma state and awake state. As another example, the output of the status assessment layer may include the injury condition of the persons in the vehicle, such as safety, slight injuries, minor injuries, serious injuries, etc.

In some embodiments, the training data of the evaluation model may be a plurality of groups of training samples with a label, and the training samples may be the appearance data of the vehicle. The appearance data of the vehicle may be derived from the image frames extracted in the monitoring information. The label of the training samples of the evaluation model is the status of the persons in the vehicle.

In some embodiments, the training method for the evaluation model may be joint training. The evaluation model may train the initial integrity judgment layer and initial status assessment layer based on a large number of training data with a label. Specifically, the training data with a label may be input to the initial integrity judgment layer to obtain the output result of the initial integrity judgment layer; the output result of the initial integrity judgment layer is then input into the initial status assessment layer to obtain the output result of the initial status assessment layer. The parameters of the initial integrity judgment layer and the initial status assessment layer are updated by training until a middle integrity judgment layer and a middle status assessment layer after the training meet a preset condition, and the integrity judgment layer and status assessment layer which have been trained are obtained. The preset condition may be that the loss function is less than a threshold, or convergence, or the training cycle reaches a threshold.

Based on the integrity of the vehicle's appearance, the status of the persons in the vehicle are initially determined by the model, thereby reducing the time of manual judgment, and improving the efficiency of determining the information and status of the related objects.

It should be noted that the description of the above-mentioned process 400 is only for examples and descriptions, but does not limit the scope of the application of the present disclosure. For those skilled in the art, various modifications and changes may be made to the process 400 under the guidance of the present disclosure. However, these modifications and changes are still within the scope of the present disclosure.

FIG. 5 is a flowchart illustrating an exemplary process for obtaining information and status of one or more related objects according to some other embodiments of the present disclosure. As shown in FIG. 5, process 500 includes the following steps. In some embodiments, the process 500 may be executed by the management platform 230.

Step 510, obtain a type of a target building.

The target building may refer to a building in the target area, for example, the building in the disaster-stricken center area, the building in the disaster-stricken spread area, and the building in the disaster-stricken buffer area.

The type of the building may refer to a category of the building. The type of the building may be distinguished according to a feature of the building, the purpose and the function of the use of the building. In some embodiments, the type of the building may include a residential building and a commercial building.

The residential building may refer to a house building that is used to provide residence. For example, the residential building may include a villa, an apartment, a dormitory, and other residential houses.

The commercial building may be a building used to provide commercial operations. For example, the commercial building may include a place of commercial business management, such as a shopping mall or a business office building. As another example, the commercial building may include a service industry building, such as a hotel, a guest house, a restaurant, etc. As another example, the commercial building may also include an entertainment facility building, such as a playground, a gymnasium, etc.

In some embodiments, the management platform may obtain the type of the target building. The management platform may obtain the type of the target building from the object platform through the sensor network platform. In some embodiments, the object platform may use the perception module to obtain the information of the target building and process the information of the target building to determine the type of the building, and the management platform obtains the type of the building through the sensor network platform. For example, the object platform may use the camera to obtain an image (e.g., an appearance image, or internal use image) of the target building, and determine the type of the target building based on the appearance image or internal use image of the target building. In some embodiments, users may enter the type of the building on the user platform, and the management platform obtains the type of target building from the user platform through the service platform.

Step 520, in response to the type of the target building being the residential building, obtain family information of the residential building, and determine the information of the one or more related objects based on the family information.

Family information may refer to information related to family life, for example, family member information, family location, family consumption, etc. Family member information may include the names, contact, and working addresses of the family members. In some embodiments, the management platform may obtain property information corresponding to the residential building based on the residential building, and obtain family information based on the property information.

In some embodiments, when the building type is a residential building, the management platform may obtain family information in the residential building and determine the information of the related objects based on the family information. For example, the management platform may determine family member information based on the family information and determine the information of the related objects based on the family member information (for example, relatives of the related objects).

In some embodiments, when the building type is a residential building, the management platform may determine the information and status of the related objects through the following methods: obtaining energy consumption information of each family in the target building; determining an energy consumption amount of each family after the occurrence of the disaster event based on the energy consumption information; and determining the status of the related object based on the energy consumption amount.

Energy consumption information may refer to various energy information consumed by each family in life. For example, the energy consumption information may include water use information, electricity use information, gas use information, etc. In some embodiments, the management platform may obtain property information corresponding to the residential building based on the residential building, and obtain the energy consumption information of each family based on the property information.

Energy consumption amount may refer to the amount of energy consumed actually by each family within a certain period. Energy consumption amount may correspond to the energy consumption of different energy consumption information. For example, energy consumption amount may include a water use consumption amount, an electricity use consumption amount, a gas use consumption amount, etc. In some embodiments, the energy consumption amount may be determined according to the energy consumption information. For example, the water use consumption amount may be determined according to the water use information; the electricity use consumption amount may be determined based on the electricity use information; gas use consumption amount may be determined according to the gas use information.

In some embodiments, the energy consumption amount may be used to reflect whether a family is in a normal living state. For example, when the value of the energy consumption amount of a family is within a normal range, it may indicate that the family is in a normal living state; when the value of the energy consumption amount of a family exceeds the normal range, it may indicate that the family is in an abnormal living state.

In some embodiments, the management platform may determine the status of the related objects based on the energy consumption amount. For example, the management platform may determine whether a family is in a normal living state based on the energy consumption amount of the family, and then determine the status of the related objects according to the living state of the family.

Merely by way of example, when the energy is used normally, it means that the family life is normal, and it may be judged that the persons (that is, the related objects) in the house are safe. Alternatively, the management platform may also determine whether the persons in the house are safe according to the fluctuation range of the energy consumption. If the fluctuation range of the energy consumption is not large and is in the normal consumption range, it may be judged that the persons in the house are safe. At this time, safety information may be sent to relatives and friends of the related objects. As another example, when the energy is not consumed (probably because of the existence of refrigerators, the energy may be consumed), it means that the living state of the family is abnormal, and no one is in the house or no one uses energy. At this time, the management platform may further determine the real situation in the house, and determine the contact persons who need to be notified and the content of the notification information (such as security or danger) according to the real situation.

In some embodiments, determining the information and status of the related objects based on the event-related information may also include: determining whether the contact persons need to be notified according to the status of the related objects. For example, when a related object is safe, the management platform may not inform a contact person or send the notification information that the related object is safe to the contact person. As another example, when a related object is in danger, the management platform may send the notification information that the related object is in danger to the contact person, so that the contact person may know about the status of the related object.

In some embodiments, the status of the related objects is different, and the contact persons who need to be notified may be different. The scope of the contact persons who need to be notified may be determined according to the status of the related objects. For example, when a related object is in danger, such as being in a coma state, the determined contact persons may include the relatives (direct relatives, close relatives) of the related object, and friends who contact frequently with the related object, and corresponding rescue personnel (such as medical personnel), etc. As another example, when a related object is safe, such as being in normal life, the determined contact persons may include the direct relatives of the related object.

In some embodiments, the determined contact persons who need to be notified according to the status of the related objects may be in the risk area (for example, the target area). In this case, it may be determined whether the scope of notification needs to be expanded according to the status of the notified persons (that is, the status of the contact persons). For example, related object 1 and related object 2 are in a risk area and are the contact persons of each other. When related object 1 and/or related object 2 are in danger, the scope of notification may be expanded to ensure that the contact persons after the expansion include at least one person not being in the risk area.

Step 530, in response to the type of the target building being the commercial building, obtain corporate information of the commercial building, and determine the information of the one or more related objects based on a social security relationship corresponding to the corporate information.

Corporate information may refer to information related to a corporation, for example, corporate basic information, corporate employee information, corporate operation information, etc. Corporate basic information may include information such as the registration time of a corporation, the corporate legal person and the basic information thereof, and the business status of the corporation. Corporate employee information may include information such as the basic information of corporate employees (such as name, contact information, family address, employment time, job, etc.) and social security information of the employees. In some embodiments, the management platform may obtain information about the person in charge of the corporation (such as the legal person) from the user platform through the service platform, and obtain the corporate information from the person in charge of the corporation.

In some embodiments, based on the social security relationship between the corporation and corporate employees, the information of the related objects may be determined based on the corporate information. For example, when the type of the target building is a commercial building, the management platform may obtain corporate information in the commercial building and determine the information of the related objects based on the social security relationship corresponding to corporate information.

In some embodiments, determining the information and status of the related objects based on event-related information may also include: obtaining an image of the target building through the satellite, and determining whether the target building is damaged by image recognition. When the target building is basically not damaged, the management platform may preliminarily determine that a person in the target building is safe and send the notification information to a contact person of the person in the target building. When the target building is damaged, the drone may be sent into the target building to shoot videos, the management platform further confirms the status of the person in the target building, and determines the contact person who need to be notified according to the status of the person.

Whether the target building is damaged can be determined in a more convenient and fast way by using the satellite image recognition, and the use of the drone can be more accurate to avoid waste of resources by sending the drone to shoot images when the target building is damaged.

In some embodiments, when using satellite image recognition to determine whether the target building is damaged, face recognition and posture recognition may be performed on a person taken by the drone to judge the status of the person. The management platform may determine the identity of the person by performing face recognition on the person taken by the drone and determine the action information of the person by performing posture recognition on the person taken by the drone. Action information of the person may include keeping static, moving, etc. Action information of the person may be used to reflect the status of the person. For example, when a person is kept static, the person may be determined to be injured, for example, the person is in a coma. As another example, when a person is sometimes slowly moving and sometimes kept static, it may be determined that the person may be hindered by obstacles, resulting in unable to move. As another example, when a person moves normally, it may be determined that the person is safe. The management platform may determine the status of the person according to the action information of the person and the identity of the person, and then determine the contact persons who need to be notified according to different status.

The use of drones can improve the recognition efficiency of face recognition and posture recognition so that the position of the person can be accurately determined, and the surrounding situation can be confirmed to facilitate subsequent rescue.

It should be noted that the description of the above-mentioned process 500 is only for examples and descriptions, but does not limit the scope of the application of the present disclosure. For those skilled in the art, various modifications and changes may be made to the process 500 under the guidance of the present disclosure. However, these modifications and changes are still within the scope of the present disclosure.

Figure 6:
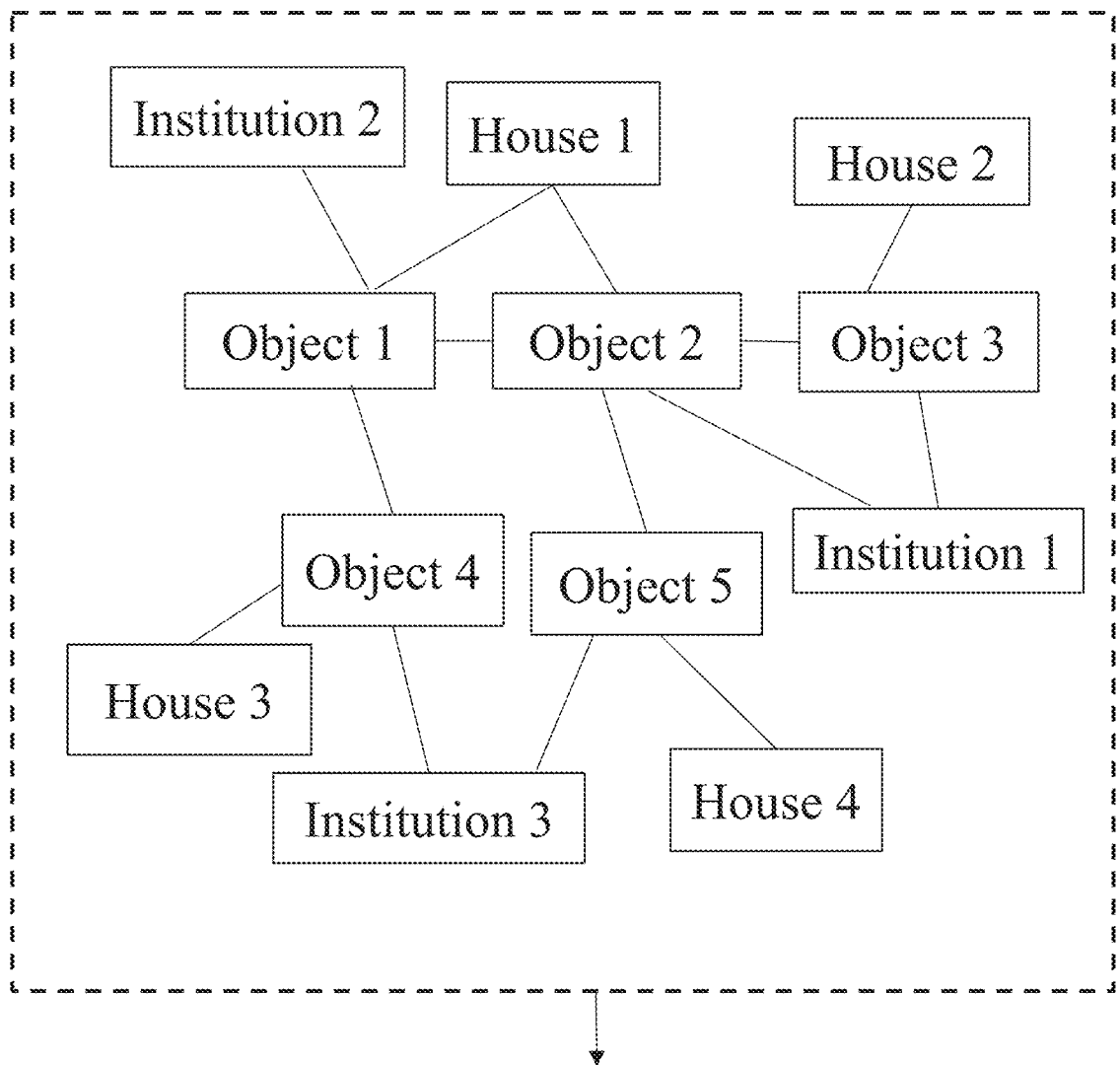
FIG. 6 is a flowchart illustrating an exemplary process for determining one or more contact persons according to some embodiments of the present disclosure.

FIG. 6 is a flowchart illustrating an exemplary process for determining one or more contact persons according to some embodiments of the present disclosure. In some embodiments, process 600 may be executed by the management platform 230.

In some embodiments, determining the contact persons who need to be notified based on the information of the related objects may include: determining the contact persons who need to be notified based on the information of the related objects and a relationship map.

The relationship map may refer to a map related to the related objects. The relationship map may include a plurality of nodes and a plurality of edges. In the relationship map, the nodes may be nodes generated according to the related objects. The type of nodes may include object nodes, house nodes, institution nodes, etc. Object nodes refer to nodes generated according to the related objects and corresponding contact persons. House nodes refer to nodes representing houses. Institution nodes refer to nodes based on institutions.

For example, seeing FIG. 6, the relationship map corresponding to the related object A may include "Object 1", "Object 2", "Object 4", "House 1", "Institution 2" and other nodes. "Object 1" corresponds to the related object A, "Object 2" is the father of "Object 1", "Object 4" is a friend of "Object 1", "House 1" is the place of residence of "Object 1", "Institution 2" is the workplace of "Object 1".

A node feature may include the identification of a related object (for example, type), contact methods (e.g., telephone, social APP account, etc.), etc. Different types of nodes may include different node features. For example, a node feature of an object node may include object name, contact information, etc. The node feature of a house/institution node may include the address and the owner of the house/institution, or the like.

In some embodiments, a plurality of nodes may be connected by the edges, and the attributes of the edges may reflect the relationship between nodes. In some embodiments, an attribute of an edges connecting the object nodes may include social types (such as relatives, friends, colleagues, etc.), social density (such as high-frequency contact, low-frequency contact), etc. For example, "Object 1" and "Object 2" are connected by an edge. Based on the attribute of this edge, the social type and social density between "Object 1" and "Object 2" may be determined. For example, seeing FIG. 6, based on the attribute of the edge between "Object 1" and "Object 2", it may be determined that "Object 1" and "Object 2" are father-son relationship, and "Object 1" and "Object 2" are the high-frequency contact person of each other.

In some embodiments, the attributes of edges that connect different types of nodes may include residence place, work, address, preset notification person, etc. For example, "Object 4" and "House 3" are connected based on an edge. Based on the attribute of this edge, it may be determined that: "Object 4" living in "House 3", the address of "House 3", and the preset notification person of "Object 4" is the person in "House 3". In some embodiments, the edges of the relationship map may have a weight (not shown in the figure) to indicate the importance of the node corresponding to the contact person to the object node corresponding to the related object.

"Object 1", "Object 2", "Object 3", "Object 4" and "Object 5" in the relationship map shown in FIG. 6 may be used as the related objects, or as the contact persons of the related objects. It may be understood that the relationship map in FIG. 6 is only used to briefly explain the relationship between the objects. This map is only a simple relationship map. In fact, the relationship map may include more nodes and more edges.

In some embodiments, the relationship map may be completed in advance and may be updated dynamically. For example, the relationship map may be established artificially in advance, and the relationship map may be updated according to different situations (such as increase, delete, etc.).

In some embodiments, the management platform may determine the contact persons who need to be notified based on a preset rule and the relationship map.

The preset rule may be a pre-formulated notification rule. Under the preset rule, the management platform may send notification information to people in different scopes according to the status of the related objects. For example, when a related object is safe, the management platform may send notification information to a high-frequency contact person and a preset notification person (a preset person to be notified) of the related object based on the relationship map. For another example, when there is a certain risk of a related object, the management platform may expand the scope of the notification based on the relationship map, such as send notification information to persons in the residential place, the located address, the high-frequency contact person, and the preset notification person.

In some embodiments, determining contact persons who need to be notified based on the information of the related objects may also include: determining a weight of an edge in the relationship map based on an event type of a disaster event; determining priority values of candidate contact persons based on the relationship map; and determining a count of the contact persons who need to be notified based on the severity degree of the disaster event.

The event type may refer to a type of a disaster event, for example, earthquakes, floods, fires, or other accidents (such as car accidents), etc.

The weight of the edge may refer to the importance of the edge. The weight of the edge may represent the importance of a node to the object node corresponding to the related object. In some embodiments, the weights of the edges connecting different nodes may be different.

In some embodiments, the weight of the edge may be set in advance.

In some embodiments, the weight of the edge may be determined according to the type of event. For example, when the event type is an earthquake, the weight of the edge connecting the object node and the house node may be relatively large. As another example, when the type of event is a traffic accident, the weight of the edge connecting the object node and the object node may be relatively large.

Candidate contact persons may refer to one or more contact persons who need to be notified temporarily determined. The final determined contact persons may be determined from the candidate contact persons.

The priority values of the candidate contact persons may refer to the scores of the candidate contact persons in the rank of determining the actual contact persons (final determined contact persons) of the related objects. The higher a priority value of a candidate contact person, the higher the score of the candidate contact person in the rank of determining the actual contact persons, and the greater the possibility that the candidate contact person is finally determined as the actual contact person of the related objects.

In some embodiments, the management platform may determine the priority values of the candidate contact persons based on the relationship map. In some embodiments, a priority value of a candidate contact person may be determined according to the number of hops of neighbors of the node where the candidate contact person is located and the node where a related object is located.

The number of hops of neighbors may refer to the number of intermediate nodes involved in the shortest route from one node to another. The fewer the number of hops of neighbors between two nodes, the closer the relationship between the two nodes. In some embodiments, the value of the number of hops of neighbors may be natural numbers such as 0, 1, 2, and 3, or the like.

For example, seeing FIG. 6, "Object 1" and "Object 2" directly connected by the edge, the number of hops of neighbors between "Object 1" and "Object 2" may be zero. As another example, the shortest route from "Object 1" to "Object 3" is "Object 1"-"Object 2"-"Object 3", then the number of hops of neighbors between "Object 1" and "Object 3" may be 1. As another example, the shortest route from "Object 1" to "House 2" is "Object 1"-"Object 2"-"Object 3"-"House 2", then the number of hops of neighbors between "Object 1" and "House 2" may be 2.

In some embodiments, the fewer the number of hops of neighbors between a node where a candidate contact person is located and a node where a related object is located, the closer the relationship between the candidate contact person and the related object, and the greater the priority value of the candidate contact person.

In some embodiments, the priority value of each of the candidate contact persons may be determined according to the weight of the edge between the node where the candidate contact person is located and the node where each of the related objects is located. For example, the greater the weight of the edge of the node where the candidate contact and the related object are located, the closer the relationship between the candidate contact and the related object, and the greater the priority value of the candidate contact person. In some embodiments, the weight of the edge may be artificially specified, or the weight of the edge may be distributed according to a weight distribution rule formulated.

The severity degree of the disaster event may reflect the disaster-stricken situation of the related objects. For example, the higher the severity degree of the disaster event, the more serious the disaster-stricken situation of the related objects.

In some embodiments, the number of contact persons may be determined according to the severity degree of the disaster event. For example, when the disaster is more serious, it may be determined that the contact persons who need to be notified include at least 10 people. When the disaster is generally serious, it may be determined that the contact persons who need to be notified include at least 5 people. In some embodiments, according to the determined number of contact persons who need to be notified, the management platform may select candidate contact persons with large priority values (for example, the top 10 and the top 5) from the candidate contact persons as the contact persons finally to be noticed.

By determining the contact persons who need to be notified through the weight of the edge and the priority values of the candidate contact persons, it can ensure that the notification information is sent to relatives and friends who are related to related objects in time and do not disturb other unrelated persons. In some embodiments, the number of contact persons may be related to the confidence degree outputted when determining the identities of the related objects based on image recognition.

The confidence degree may refer to the credibility degree of identifying the information of the related objects. For example, the confidence degree may include the credibility degree of the identities of the related objects. The confidence degree may be used to reflect the accuracy degree of the information of the related objects. The confidence degree may be represented by real numbers, percentages, etc. The confidence degree may be output together with the recognition result by the model. In some embodiments, the higher the confidence degree of the determined information of the related objects by the image recognition, the larger the number of contact persons who need to be notified.

In some embodiments, the determining identity based on image recognition may do not limit to determine identity based on image recognition on a person, also on license plate numbers, buildings, etc. For example, the identity of the owner of the vehicle may be determined based on the recognition on the license plate number of the vehicle in the traffic accident, the number of contact persons may be determined based on the confidence degree of the recognized license plate number. The higher the confidence degree of the recognized license plate number, the larger the number of the corresponding contact persons who need to be notified.

By establishing the corresponding relationship between the confidence degree and the number of contact persons who need to be notified, when the identity of the related objects is unknown, disturbance of non-related person can be avoided because of the excessive number of contact persons notified, and waste of public resources on the platform can be avoided.

In some embodiments, when the weight of the edge in the relationship map is determined, the weight of the edge involved in a common node may be increased.

A common node may be a node that has an edge with both a related object and a contact person. The type of the common node may include one or more of an object node, a house node, an institution node, etc. For example, "Object 2", "Institution 1", and "House 1" in FIG. 6 may be common nodes. For more explanations about common node and how to determine the common node, see FIG. 7.

In some embodiments, the management platform may determine the common node in the relationship map based on the relationship map, and increase a weight of an edge involved in the common node. For example, the basic weight of the edge between the candidate contact person and the related object may be set as 1. When the candidate contact person has edges with other n related objects at the same time, the weight of the candidate contact person is increased by 0.5 for each related object. In the end, the weight of the edge between the candidate contact person and the related object is increased to be 1+0.5*n. Merely by way of example, seeing FIG. 6, setting "Object 2" as the related object, "Object 3" as a candidate contact person, the basic weight of the edge between "Object 2" and "Object 3" is 1, and "Object 3" also has edges with two other related objects, namely "House 2" and "Institution 1". Thus, the weight of "Object 3" is increased by 0.5 for "House 2" and "Institution 1", respectively. The weight of the edge between "Object 2" and "Object 3" may be finally determined to be 1+0.5*2=2.

It should be noted that the value of the increase in the weight of the candidate contact person may not be limited to the above 0.5, and it may also be other appropriate values, such as 0.1, 0.3, 0.6, etc. The value of the weight of the candidate contact person increased for the related object may be set according to the actual situation.

It may ensure that candidate contact persons may receive the notification information in time by increasing the weights of the edges of the candidate contact persons connected to one or more related objects.

It should be noted that the description of the above-mentioned process 600 is only for examples and descriptions, but does not limit the scope of the application of the present disclosure. For those skilled in the art, various modifications and changes may be made to the process 600 under the guidance of the present disclosure. However, these modifications and changes are still within the scope of the present disclosure.

Figure 7:
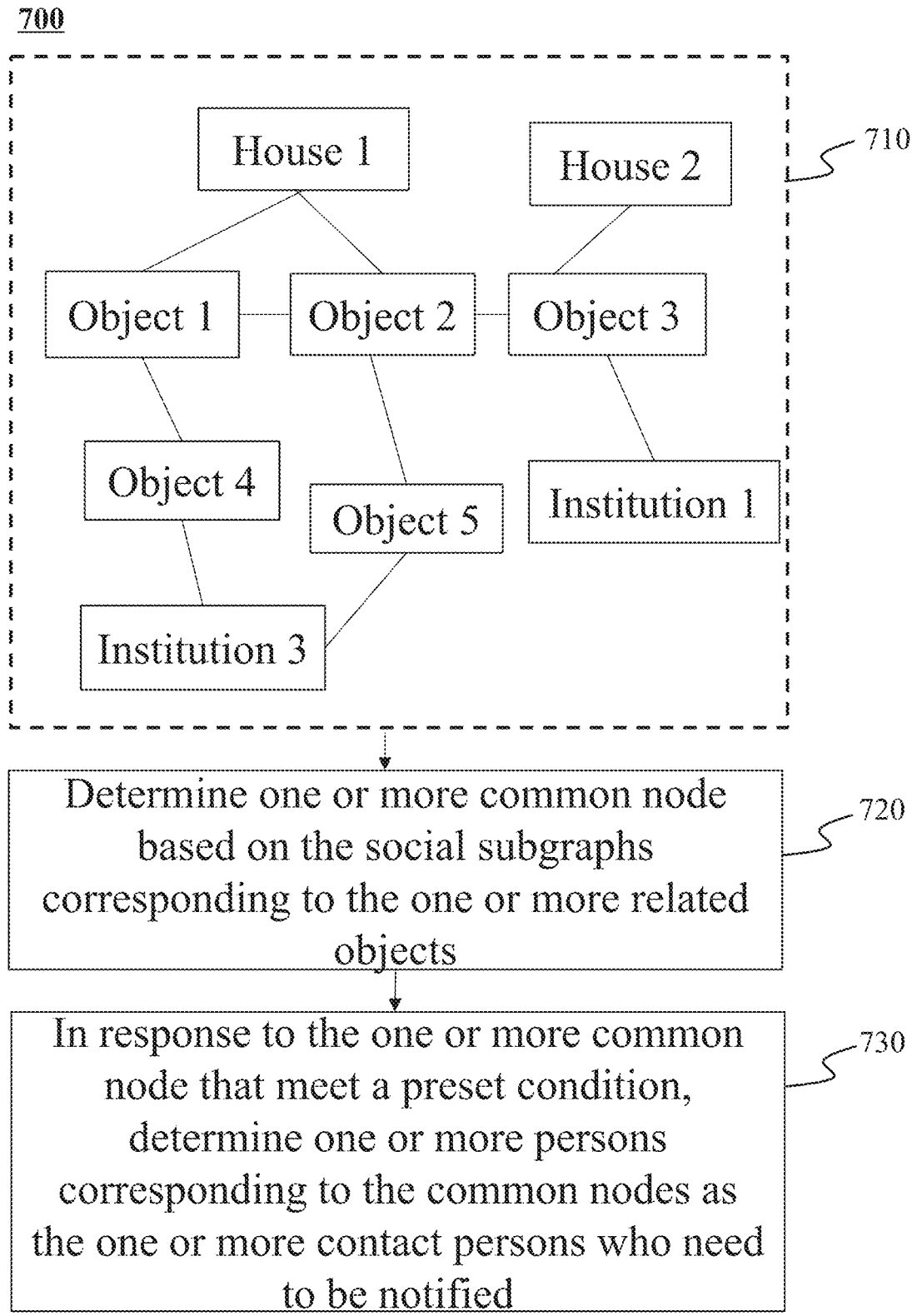
FIG. 7 is another flowchart illustrating an exemplary process for determining one or more contact persons according to some embodiments of the present disclosure.

FIG. 7 is another flowchart illustrating an exemplary process for determining one or more contact persons according to some embodiments of the present disclosure. As shown in FIG. 7, process 700 includes the following steps. In some embodiments, process 700 may be executed by the management platform 230.

Step 710, obtain social subgraphs corresponding to related objects of the one or more related objects based on the relationship map, respectively, each of the social subgraphs meeting a preset requirement.

The preset requirement may refer to a requirement of an adjacency degree of an edge connected to a related object. For example, the preset requirement may be that the adjacency degree of the edge connected to a certain object node is at least 2.

The adjacency degree may refer to a distance relationship between two nodes. For example, the adjacency degree may include 1, 2, 5, etc. The adjacency degree being 1 means that the two nodes are directly connected. For example, the related object is directly connected to the contact person, and the adjacency degree of the related object and the contact person is 1. The adjacency degree being 2 indicates that the two nodes are connected through another node. For example, the related object is "Object 1", the wife of the related object is "Object 2", and the wife's brother is "Object 3". The connection manner of "Object 1", "Object 2", and "Object 3" is "Object 1"*"Object 2"-"Object 3". The adjacency degree of "Object 1" and "Object 3" is 2.

The social subgraph may refer to a graph composed of all nodes and edges thereof, wherein each of the nodes is connected with an edge, and the adjacency degree of the edge connected to an object node is not less than 1 and not more than n (n>1). Taking the social subgraph which is a graph composed of all nodes and edges thereof which are connected with the edge, the adjacency degree of which connected to the object node is not more than 2 as an example, the social subgraph of "Object 3" in FIG. 7 is as follows: there are three edges connected to "Object 3", adjacency degree of which is 1, that is, "Object 3" is directly connected with "House 2", "Institution 1", and "Object 2" through the edges, respectively. There is one edge connected to "Object 3", the adjacency degree of which is 2, that is, "Object 3" is respectively connected with "House 1", "Object 1", "Object 5" through "Object 2", and the adjacency degree between "Object 3" and each of "house 1", "Object 1" and "Object 5" is 2. "Object 2", "House 1", "Object 1", "Object 5", "House 2", "Institution 1", and the edges between these nodes constitute the social subgraph of "Object 3". In the same way, the social subgraph of "Object 4" may be composed of "Institutional 3", "Object 5", "Object 1", "House 1", "Object 2", and the edges between these nodes.

In some embodiments, the management platform may obtain social subgraphs of one or more related objects that respectively meet the preset requirement based on the relationship map. Social subgraphs may be graphs composed of some nodes and some edges of the relationship map. In some embodiments, the management platform may select part of object nodes from the relationship map, and determine the social subgraphs corresponding to the part of object nodes according to all nodes and edges thereof which are connected with an edge, the adjacency degree of which connected the part of object nodes is not more than a maximum of the adjacency degree. The maximum of the adjacency degree may be set in advance.

Step 720, determine one or more common nodes based on the social subgraphs corresponding to the related objects.

A common node may refer to a node that appears at least in the social subgraphs corresponding to two object nodes. For example, the common node may include a node that appears in the social subgraph corresponding to the related object and appears in the social subgraph corresponding to the contact person. Taking the social subgraph of "Object 3" and "Object 4" in FIG. 7 as an example, the nodes in the social subgraph of "Object 3" include "Object 2", "House 1", "Object 1", "Object 5", "House 2", and "Institution 1", the nodes in the social subgraph of "Object 4" include "Institution 3", "Object 5", "Object 1", "House 1", and "Object 2". Therefore, "Object 2", "House 1", "Object 1", and "Object 5" are determined as common nodes.

In some embodiments, the management platform may determine the one or more common nodes based on the social subgraphs corresponding to the related objects. For example, the management platform may determine a common node of at least two social subgraphs based on the social subgraphs corresponding to at least two related objects. The type of the common node determined based on social subgraphs may be an object node, a house node, an institution node, etc.

Step 730, in response to the one or more common nodes that meet a preset condition, determine one or more persons corresponding to the one or more common nodes as the one or more contact persons who need to be notified.

The preset condition may be a condition that a condition needs to be met to determine a contact person who needs to be notified. For example, the preset condition may be that: a type of the common node is an object node. For another example, the preset condition may be that: the adjacency degree of the common node and the related object is not larger than the preset value (such as 2).

In some embodiments, after determining the one or more common nodes according to the social subgraphs corresponding to the one or more related objects, the management platform may further determine whether each common node in the one or more common nodes meets the preset condition based on the preset condition, and determine a person corresponding to the common node meeting the preset condition as the contact person who needs to be notified.

For example, when the preset condition is that: the type of the common node is an object node, the common nodes in the social subgraphs corresponding to "Object 3" and "Object 4" include "Object 2", "House 1", "Object 1", and "Object 5", "Object 2", "Object 1" and "Object 5" are object nodes, which meet the preset condition; "House 1" is a house node and does not meet the preset condition. Based on this, the management platform may determine the three object nodes that meet the preset condition, namely "Object 2", "Object 1" and "Object 5" as the contact persons who need to be notified when "Object 3" and "Object 4" are both used as related objects.

By determining the contact persons who need to be notified through the common nodes, the candidate contact persons with a high degree of association with the related objects receive the notification information in time can be ensured. The management platform may determine one or more contact persons corresponding to one or more related objects based on the one or more common nodes, so as to notify all the persons need to be notified in one notice in the time limit, thereby saving communication resources.

It should be noted that the description of the above-mentioned process 700 is only for examples and descriptions, but does not limit the scope of the application of the present disclosure. For those skilled in the art, various modifications and changes may be made to process 700 under the guidance of the present disclosure. However, these modifications and changes are still within the scope of the present disclosure.

The basic concepts have been described above, apparently, for those skilled in the art, the above-mentioned detailed disclosure is only used as an example, and it does not constitute a limitation of the present disclosure. Although there is no clear explanation here, those skilled in the art may make various modifications, improvements, and corrections for the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" mean that a certain feature, structure, or characteristic is connected with at least one embodiment of the present disclosure. Therefore, it should be emphasized and noted that two or more references of "an embodiment" or "one embodiment" or "an alternative embodiment" in various places in the present disclosure do not necessarily refer to the same embodiment. In addition, some characteristics, structures, or characteristics of one or more embodiments in this manual may be properly combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose of description and that the appended claims are not limited to the disclosed embodiments, on the contrary, are intended to cover modifications and equivalent combinations that are within the spirit and scope of the embodiments of the present disclosure. For example, although the implementation of various components described above may be embodied in a hardware device, it may also be implemented as a software only solution, e.g., an installation on an existing server or mobile device.

Similarly, it should be noted that to simplify the expressions disclosed in the present disclosure and thus help the understanding of one or more embodiments of the invention, in the foregoing description of the embodiments of this specification, various features may sometimes be combined into one embodiment, drawings or descriptions thereof. However, this disclosure method does not mean that the characteristics required by the object of the present disclosure are more than the characteristics mentioned in the claims. Rather, claimed subject matter may lie in less than all features of a single foregoing disclosed embodiment.

Some embodiments use numbers with description ingredients and attributes. It should be understood that the number described by such examples is used in some examples with the modified words "about", "approximate" or "generally" to modify. Unless otherwise stated, "about", "approximate" or "generally" indicates that the number allows a change of ±20%. Correspondingly, in some embodiments, the value parameters used in the present disclosure and claims are approximate values. The approximate values may be changed according to the characteristics of individual embodiments. In some embodiments, the numerical parameters should consider the effective digits specified and use a general digit reservation method. Although in some embodiments of the present disclosure, the numerical domain and parameters used to confirm the range of its scope are approximate values, the setting of such values may be as precise as possible within the feasible range in specific embodiments.

For each patent, patent application, patent application publications and other materials cited by the present disclosure, such as articles, books, instructions, publications, documents, etc., all of them will be incorporated in the present disclosure as a reference. History application documents that are inconsistent or conflictive with the contents of the present disclosure are excluded, as well as documents (currently or subsequently appended to the present disclosure) limiting the broadest scope of the claims of the present specification. It should be noted that, if there is any inconsistency or conflict between the descriptions, definitions, and/or usage of terms in subsidiary information of the present disclosure and the contents of the present disclosure, the descriptions, definitions, and/or usage of terms in the present disclosure shall prevail.

Finally, it should be understood that the embodiments described in the present disclosure are only used to illustrate the principle of the embodiments of the present disclosure. Other deformations are also possible within the scope of the present disclosure. Therefore, merely by way of example and not limitation, alternative configurations of the embodiments of the present disclosure may be considered consistent with the teachings of the present disclosure. Correspondingly, the embodiments of the present disclosure are not limited to the embodiments clearly introduced and described in the present disclosure.

What is claimed is:

1. A method for post-disaster contact in a smart city based on Internet of Things, which is applied to a management platform, comprising:
   in response to the occurrence of a disaster event, obtaining event-related information from an object platform through a sensor network platform, wherein the event-related information comprises monitoring information, and the event-related information is obtained through a camera and/or a drone;
   determining information and status of one or more related objects based on the event-related information;
   determining one or more contact persons who need to be notified based on the information of the one or more related objects; and
   sending notification information to the one or more contact persons by sending the notification information to a user platform through a service platform, wherein the notification information is received through a user terminal;
   wherein the determining information of one or more related objects based on the event-related information includes:
      obtaining a type of a target building based on a perception module; wherein the type of the target building comprises a residential building and a commercial building;
      in response to the type of the target building being the residential building, obtaining family information of the residential building, and determining the information of the one or more related objects based on the family information;

in response to the type of the target building being the commercial building, obtaining corporate information of the commercial building, and determining the information of the one or more related objects based on a social security relationship corresponding to the corporate information; and extracting image frames based on the monitoring information, and determining a type of a vehicle in a target area by performing target recognition on the image frames; wherein the type of the vehicle comprises a public vehicle and a private vehicle, and the target recognition is implemented based on a machine learning model;

in response to the type of the vehicle being the public vehicle, obtaining ticket checking information of passengers of the public vehicle, and determining the information of the one or more related objects based on the ticket checking information of the passengers; and in response to the type of the vehicle being the private vehicle, determining a license plate number of the private vehicle by performing image recognition on the image frames, and determining the information of the one or more related objects based on the license plate number;

wherein the determining status of one or more related objects based on the event-related information includes:

determining the status of the one or more related objects using an evaluation model based on appearance data of the vehicle, the status of the one or more related objects including a result of vehicle integrity judgment and a state of the persons in the vehicle, the evaluation model being a machine learning model, the evaluation model including an integrity judgment layer and a status assessment layer, which is obtained by a training process including:

obtaining a plurality of training samples and labels;

training an initial integrity judgment layer and an initial status assessment layer, based on the plurality of training samples and the labels; and obtaining the integrity judgment layer and the status assessment layer until a trained integrity judgment layer and a trained status assessment layer meeting a preset condition.

2. The method of claim 1, wherein the determining status of one or more related objects based on the event-related information comprises:

extracting image frames based on the monitoring information; and determining the status of the one or more related objects by performing image recognition on the image frames.

3. The method of claim 1, wherein in response to the type of the target building being the residential building, the determining information and status of one or more related objects based on the event-related information further comprises:

obtaining energy consumption information of each family in the target building;

determining an energy consumption amount of each family after the occurrence of the disaster event based on the energy consumption information; and determining the status of the one or more related objects based on the energy consumption amount.

4. The method of claim 1, wherein the determining one or more contact persons who need to be notified based on the information of the one or more related objects comprises:

determining the one or more contact persons who need to be notified based on the information of the one or more related objects and a relationship map.

5. The method of claim 4, wherein the determining one or more contact persons who need to be notified based on the information of the one or more related objects further comprises:

obtaining social subgraphs corresponding to related objects of the one or more related objects based on the relationship map, respectively, each of the social subgraphs meeting a preset requirement;

determining one or more common nodes based on the social subgraphs corresponding to the related objects; and in response to the one or more common nodes that meet a preset condition, determining one or more persons corresponding to the one or more common nodes as the one or more contact persons who need to be notified.

6. A system for post-disaster contact in a smart city based on Internet of Things, comprising: a user platform, a service platform, a management platform, a sensor network platform, and an object platform; wherein the management platform is configured to perform the following operations:

in response to the occurrence of a disaster event, obtaining event-related information from the object platform through the sensor network platform, wherein the event-related information comprises monitoring information, and the event-related information is obtained through a camera and/or a drone;

determining information and status of one or more related objects based on the event-related information;

determining one or more contact persons who need to be notified based on the information of the one or more related objects; and sending notification information to the one or more contact persons by sending the notification information to the user platform through the service platform, wherein the notification information is received through a user terminal;

wherein to determine information of one or more related objects based on the event-related information, the management platform is further configured to perform the following operations:

obtaining a type of a target building based on a perception module; wherein the type of the target building comprises a residential building and a commercial building;

in response to the type of the target building being the residential building, obtaining family information of the residential building, and determining the information of the one or more related objects based on the family information;

in response to the type of the target building being the commercial building, obtaining corporate information of the commercial building, and determining the information of the one or more related objects based on a social security relationship corresponding to the corporate information; and extracting image frames based on the monitoring information, and determining a type of a vehicle in a target area by performing target recognition on the image frames; wherein the type of the vehicle comprises a public vehicle and a private vehicle, and the target recognition is implemented based on a machine learning model;

in response to the type of the vehicle being the public vehicle, obtaining ticket checking information of passengers of the public vehicle, and determining the information of the one or more related objects based on the ticket checking information of the passengers; and in response to the type of the vehicle being the private vehicle, determining a license plate number of the private vehicle by performing image recognition on the image frames, and determining the information of the one or more related objects based on the license plate number;

wherein the determining status of one or more related objects based on the event-related information includes:

determining the status of the one or more related objects using an evaluation model based on appearance data of the vehicle, the status of the one or more related objects including a result of vehicle integrity judgment and a state of the persons in the vehicle, the evaluation model being a machine learning model, the evaluation model including an integrity judgment layer and a status assessment layer, which is obtained by a training process including:

obtaining a plurality of training samples and labels;

training an initial integrity judgment layer and an initial status assessment layer, based on the plurality of training samples and the labels; and obtaining the integrity judgment layer and the status assessment layer until a trained integrity judgment layer and a trained status assessment layer meeting a preset condition.

7. The system of claim 6, wherein the management platform is further configured to perform the following operations:

extracting image frames based on the monitoring information; and determining the status of the one or more related objects by performing image recognition on the image frames.

8. The system of claim 6, wherein in response to the type of the target building being the residential building, the management platform is further configured to perform the following operations:

obtaining energy consumption information of each family in the target building;

determining an energy consumption amount of each family after the occurrence of the disaster event based on the energy consumption information; and determining the status of the one or more related objects based on the energy consumption amount.

9. The system of claim 6, wherein the management platform is further configured to perform the following operations:

determining the one or more contact persons who need to be notified based on the information of the one or more related objects and a relationship map.

10. The system of claim 9, wherein the management platform is further configured to perform the following operations:

obtaining social subgraphs corresponding to related objects of the one or more related objects based on the relationship map, respectively, each of the social subgraphs meeting a preset requirement;

determining one or more common nodes based on the social subgraphs corresponding to the one or more related objects; and in response to the one or more common nodes that meet a preset condition, determining one or more persons corresponding to the one or more common nodes as the one or more contact persons who need to be notified.

11. A non-transitory computer-readable storage medium comprising computer instructions, wherein when executed by a processor, the computer instructions direct the processor to implement the method of claim 1.

12. The method of claim 1, wherein the determining status of one or more related objects based on the event-related information further comprises:

obtaining an image of the target building through a satellite, and determining whether the target building is damaged by the image recognition;

in response to the target building being damaged, sending the drone into the target building to shoot videos, and obtaining the status of the one or more related objects.

13. The system of claim 6, wherein the management platform is further configured to perform the following operations:

obtaining an image of the target building through a satellite, and determining whether the target building is damaged by the image recognition;

in response to the target building being damaged, sending the drone into the target building to shoot videos, and obtaining the status of the one or more related objects.

* * * * *